Feb. 3, 1953 — K. KRONWALL — 2,627,292

AUGER BIT

Filed Sept. 8, 1947

INVENTOR.
Konstantin Kronwall

BY
Smith, Olsen & Baird
Attorneys

Patented Feb. 3, 1953

2,627,292

UNITED STATES PATENT OFFICE 2,627,292

AUGER BIT

Konstantin Kronwall, Winnetka, Ill., assignor to United Drill and Tool Corporation, Chicago, Ill., a corporation of Michigan Application September 8, 1947, Serial No. 772,865

4 Claims. (Cl. 145—116)

The present invention relates to auger bits and the principal object thereof is to provide an auger bit of rugged and economical construction.

Another object of the invention is to provide an auger bit of simple construction and arrangement that may be manufactured utilizing a minimum number of operations.

Further features of the invention pertain to the particular arrangement of elements of the auger bit, whereby the above outlined and additional operating features thereof are attained.

Figure 1:
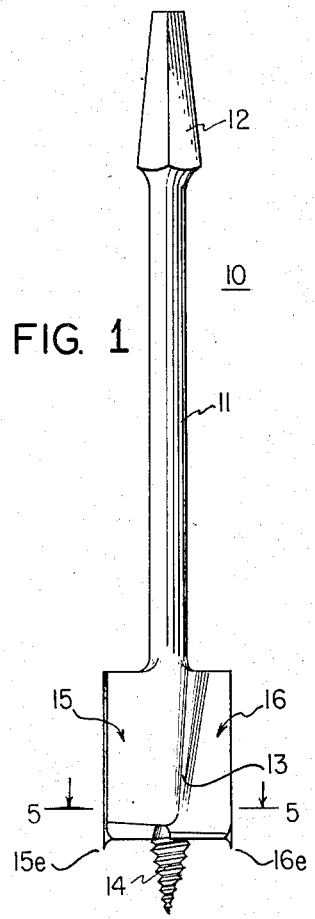
Figure 2:
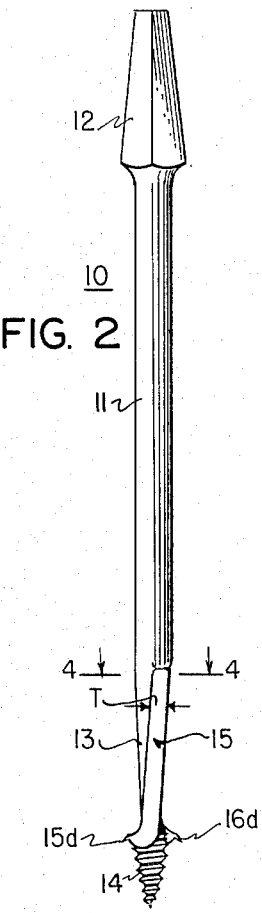
Figure 3:
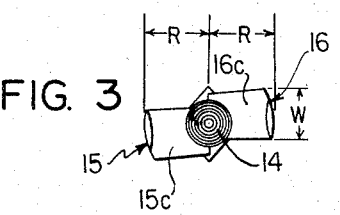
Figure 4:
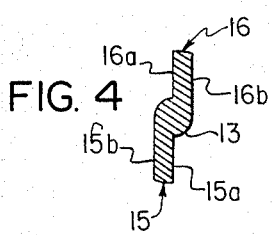
Figure 5:
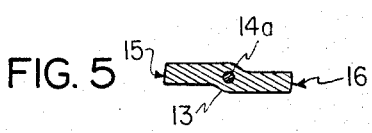

The invention, both as to its organization and method of operation, together with further objects and advantages thereof, will best be understood by reference to the following specification taken in connection with the accompanying drawing, in which Figure 1 is a front view of an auger bit embodying the present invention; Fig. 2 is a side view of the auger bit, shown in Fig. 1; Fig. 3 is an end view of the auger bit, shown in Figs. 1 and 2; Fig. 4 is a transverse sectional view of the auger bit taken in the direction of the arrows along the line 4—4 in Fig. 2; and Fig. 5 is a transverse sectional view of the auger bit taken in the direction of the arrows along the line 5—5 in Fig. 1.

Referring now more particularly to the drawing the auger bit 10 there illustrated, and embodying the features of the present invention, comprises an elongated longitudinally extending cylindrical shank 11, carrying at its upper end a squared shank fixture 12 adapted to be received in a chuck or other tool and terminating in a forwardly tapered lower end 13 carrying an axially aligned screw point 14. Specifically, the extreme lower end of the tapered end 13 has a centrally disposed hole drilled therein which receives a stem 14a formed on the screw point 14, as illustrated in Fig. 5. After the stem 14a of the screw point 14 is inserted into the hole mentioned, the two parts are brazed or welded together to provide an integral structure.

Also the tapered end 13 carries two oppositely directed laterally extending blades 15 and 16 adjacent to the screw point 14 and rearwardly thereof. The blades 15 and 16 are formed integrally with the shank 11 and each blade extends laterally the same radius R from the axis of the shank 11, as illustrated in Fig. 3. The blade 15 comprises a body, substantially rectangular in front view, and including a leading surface 15a and a trailing surface 15b terminating in an out-flared cutting head 15c. Likewise, the blade 16 comprises a body, substantially rectangular in front view, and including a leading surface 16a and a trailing surface 16b terminating in an out-flared cutting head 16c. Specifically, the cutting head 15c comprises an out-flared extension lip, into which the surfaces 15a and 15b merge, that is provided with a cutting edge 15d and carries a forwardly projecting spur 15e. Likewise the cutting head 16c comprises an out-flared extension lip, into which the surfaces 16a and 16b merge, that is provided with a cutting edge 16d and carries a forwardly projecting spur 16e. Thus the cutting heads 15c and 16c are disposed on opposite sides of the axis of the shank 11 adjacent to the screw point 14 and rearwardly thereof.

Moreover, the two blades 15 and 16 are arranged between two parallel planes spaced apart a distance established by the diameter of the shank 11, the upper ends of the trailing surfaces 15b and 16b of the respective blades 15 and 16 being disposed in the respective planes mentioned, as clearly illustrated in Figs. 2 and 4.

The two trailing surfaces 15b and 16b are respectively disposed in two spaced apart converging planes arranged tangential to two diametrically positioned converging lines on the surface of the tapered end 13 adjacent to the screw point 14, the trailing surfaces 15b and 16b merging into the surface of the tapered end 13 along the respective converging lines mentioned, as illustrated in Figs. 2 and 4. The leading surfaces 15a and 16a are both disposed intermediate the two converging planes mentioned, as illustrated in Figs. 2 and 4. Thus the leading surface of each blade is disposed below the trailing surface of the other blade; whereby two chip guiding channels are respectively defined in the bodies of the two blades and respectively extend rearwardly from the two cutting heads and outwardly from the screw point 14.

In order to obtain most satisfactory results in regard to rugged construction and smooth operation of the auger bit 10, it has been found the thickness T of the blades 15 and 16 should be approximately ¼ to ½ of the radius R, as indicated in Fig. 2, and that the width W of each of the cutting heads 15c and 16c should be at least ½ of the radius R, as indicated in Fig. 3.

In the manufacture of the auger bit 10, it is preferable that the shank 11, the squared shank fixture 12, and the blades 15 and 16 be forged from a suitable piece of steel stock to approximate shape and then machined to the required dimensions, the centrally disposed hole being drilled in the extreme lower end of the tapered end 13. The screw point 14 is formed of steel stock and is machined to the required dimensions and the stem 14a thereof is inserted into the hole mentioned and then brazed or welded in place to provide an integral structure. Next the auger bit 10 is heat treated and tempered as required; and ultimately it is buffed and polished to present a finished and pleasant appearance for commercial purposes.

In view of the foregoing, it is apparent that there has been provided an auger bit of rugged and economical construction that it especially suited to quantity and quality production by machine methods.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An integral auger bit comprising a longitudinally extending cylindrical shank terminating at the forward end thereof in two oppositely directed laterally extending substantially flat blades, said two blades being arranged between two parallel planes spaced apart a distance established by the diameter of said shank and respectively terminating at the forward ends thereof in two forwardly directed cutting heads arranged on opposite sides of the longitudinal center line of said shank, each of said blades being provided with leading and trailing surfaces lying in substantially parallel planes and terminating in the respective one of said cutting heads, the leading surface of each of said blades being pitched at a slight leading angle with respect to the center line of said shank and toward the respective one of said cutting heads and cooperating with the forward end of said shank to define a chip-guiding channel extending rearwardly from the respective one of said cutting heads, and a screw point carried by the forward end of said shank between said two cutting heads and projecting forwardly along the longitudinal center line of said shank.

2. The auger bit set forth in claim 1, wherein each of said cutting heads includes an outwardly flared cutting edge and a forwardly projecting spur.

3. The auger bit set forth in claim 1, wherein the trailing surfaces of said two blades are arranged tangential to the forward end of said shank at two substantially diametrically opposite points on the surface of the forward end of said shank.

4. The auger bit set forth in claim 1, wherein each of said blades extends laterally the same radial distance from the longitudinal center line of said shank the thickness of each of said blades is approximately ¼ to ½ of said radial distance, and the width of each of said cutting heads is at least ½ of said radial distance.

KONSTANTIN KRONWALL.

REFERENCES CITED

The following references are of record in the file of this patent:

UNITED STATES PATENTS

| Number | Name | Date |
|---|---|---|
| 124,089 | Shepardson | Feb. 27, 1872 |
| 149,637 | Buchter | Apr. 14, 1874 |
| 484,221 | Moore | Oct. 11, 1892 |
| 1,895,205 | Prior | Jan. 24, 1933 |
| 2,025,358 | Maschek | Dec. 24, 1935 |
| 2,055,144 | Christian | Sept. 22, 1936 |

FOREIGN PATENTS

| Number | Country | Date |
|---|---|---|
| 18,548 | Norway | Mar. 27, 1908 |
| 193,786 | Great Britain | Mar. 1, 1923 |
| 194,542 | Great Britain | Mar. 15, 1923 |